United States Patent
Raasch et al.

(10) Patent No.: US 12,442,556 B2
(45) Date of Patent: Oct. 14, 2025

(54) FLOWRATE DETERMINATION SYSTEM AND METHOD FOR A FLOW CONTROL VALVE

(71) Applicant: Tyco Fire & Security GmbH, Neuhausen am Rheinfall (CH)

(72) Inventors: Jason J. Raasch, Cedarburg, WI (US); Christopher Brophy, Cedarburg, WI (US); Kevin A. Weiss, Chicago, IL (US); Duane S. Freimuth, Franklin, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 1193 days.

(21) Appl. No.: 17/187,175

(22) Filed: Feb. 26, 2021

(65) Prior Publication Data

US 2022/0275963 A1    Sep. 1, 2022

(51) Int. Cl.
*F24F 11/75* (2018.01)
*F16K 37/00* (2006.01)
(Continued)

(52) U.S. Cl.
CPC .......... *F24F 11/75* (2018.01); *F16K 37/0033* (2013.01); *F16K 37/0041* (2013.01);
(Continued)

(58) Field of Classification Search
CPC .. F24F 11/75; F24F 11/63; F24F 11/88; F24F 2110/10; F24F 2110/40; F24D 2220/0271; F24D 19/1084; G01F 1/363; G01F 1/383; G05D 7/0635; F16K 37/0033; F16K 37/0041

See application file for complete search history.

(56) References Cited

U.S. PATENT DOCUMENTS 6,827,100 B1   12/2004   Carlson
7,451,781 B2   11/2008   Carlson
(Continued)

FOREIGN PATENT DOCUMENTS

CN    111006304 A   *  4/2020
EP    0 462 432 A2    12/1991
WO    WO-2009022148 A1 *  2/2009    ............... F17D 5/02

OTHER PUBLICATIONS

EP Office Action for EP Appl. Ser No. 22158804.9 dated Dec. 6, 2023 (4 pages).
(Continued)

Primary Examiner — Atif H Chaudry
(74) Attorney, Agent, or Firm — Foley & Lardner LLP

(57) ABSTRACT

A flow control device for controlling flow in a heating, ventilation, or air conditioning (HVAC) system is shown. The flow control device includes a valve body including an inlet path, an outlet path, a valve member, and a valve stem coupled to the valve member. The flow control device includes a first sensor configured to obtain pressure measurements within the valve body, a second sensor configured to obtain displacement measurements of the valve stem, and a controller including a processing circuit configured to determine a flowrate based at least on the pressure measurements from the first sensor and the displacement measurements from the second sensor.

20 Claims, 13 Drawing Sheets

(51) Int. Cl.
   *F24F 11/49* (2018.01)
   *F24F 11/63* (2018.01)
   *F24F 11/88* (2018.01)
   *F24F 110/10* (2018.01)
   *F24F 110/40* (2018.01)
   *G01F 1/36* (2006.01)
   *G01F 1/38* (2006.01)
   *G05D 7/06* (2006.01)

(52) U.S. Cl.
   CPC .............. *F24F 11/49* (2018.01); *F24F 11/63* (2018.01); *F24F 11/88* (2018.01); *G01F 1/363* (2013.01); *G01F 1/383* (2013.01); *G05D 7/0635* (2013.01); *F24F 2110/10* (2018.01); *F24F 2110/40* (2018.01)

(56) References Cited

U.S. PATENT DOCUMENTS

| | | |
|---|---|---|
| 9,500,288 B2 | 11/2016 | Semmes |
| 9,658,628 B2 | 5/2017 | Burt |
| 9,746,199 B1 | 8/2017 | Drees et al. |
| 10,007,239 B2 | 6/2018 | Burt |
| 10,317,261 B2 | 6/2019 | Noboa et al. |
| 10,323,768 B2 | 6/2019 | Tuineag |
| 10,359,208 B2 | 7/2019 | Drees et al. |
| 10,635,120 B2 | 4/2020 | D'Silva et al. |
| 10,712,042 B2 | 7/2020 | Passoni et al. |
| 10,739,029 B2 | 8/2020 | Sinha et al. |
| 2007/0151321 A1* | 7/2007 | Ohmi .................. G05D 7/0635 702/100 |
| 2012/0185102 A1* | 7/2012 | Skoglund ................ G01F 25/10 700/282 |
| 2019/0353385 A1* | 11/2019 | Aucoin .................... F24F 11/63 |
| 2020/0264067 A1 | 8/2020 | Lance et al. |

OTHER PUBLICATIONS

EP Office Action and Partial European Search Report on EP Appl. Ser. No. 22 15 8804 dated Aug. 11, 2022 (13 pages).

Extended European Search Report on EP Appl. Ser. No. 22 15 8804 dated Nov. 11, 2022 (11 pages).

EP Office Action for EP Appl. Ser. No. 22158804.9 dated Nov. 22, 2024 (3 pages).

EP Office Action for Appl. Ser. No. EP 22158804.9 dated Jul. 9, 2024 (3 pages).

* cited by examiner

FLOWRATE DETERMINATION SYSTEM AND METHOD FOR A FLOW CONTROL VALVE

BACKGROUND

The present disclosure relates generally to heating, ventilation, or air conditioning (HVAC) systems. More specifically, the present disclosure relates to flow control valves in HVAC systems.

HVAC systems that implement electronic, flow-sensing, remotely configurable, valves (e.g., zone control valves) for HVAC applications (e.g., hydronic HVAC applications) often utilize one or more flow sensors for determining the flowrate through the valve. Flow sensors add to the complexity and expense of the zone control valves.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a flow control device for controlling flow in a heating, ventilation, or air conditioning (HVAC) system. The flow control device includes a valve body including an inlet path, an outlet path, a valve member, and a valve stem coupled to the valve member. The flow control device includes a first sensor configured to obtain pressure measurements within the valve body, a second sensor configured to obtain displacement measurements of the valve stem, and a controller including a processing circuit configured to determine a flowrate based at least on the pressure measurements from the first sensor and the displacement measurements from the second sensor.

In some embodiments, the valve body further includes a diaphragm. In some embodiments, the first sensor is configured to obtain the pressure measurements based on one or more displacement measurements of the diaphragm.

In some embodiments, the controller is further configured to receive the pressure measurements the displacement measurements, receive flow control device variables from a database, the flow control device variables comprising at least one of a specific gravity, a flow coefficient of the flow control device, and a spring characteristic, and a diaphragm characteristic, determine a pressure differential between the pressure in the inlet path and the pressure in the outlet path based on at least the pressure measurements and the flow control device parameters, and determine the flowrate based on at least the pressure differential and the flow control device parameters.

In some embodiments, the controller is further configured to determine an amount of energy provided by the heat exchanger and adjust the valve stem based on the amount of energy.

In some embodiments, the controller is further configured to receive flow setpoint instructions for the flow control device, provide the pressure measurements and the displacement measurements as inputs to a machine learning module, use the machine learning module to generate a model of behavior of the flow, and provide control signals to HVAC equipment based on the model to satisfy the flow setpoint instructions.

In some embodiments, determining the flowrate further includes querying a lookup table to compare at least one of the pressure measurements and the displacement measurements to determine an estimated flowrate, wherein the lookup table includes information specific to a type or a manufacture of the flow control device.

In some embodiments, the flow control device further includes an actuator configured to drive the valve stem, wherein the actuator is coupled to the valve stem. In some embodiments, the controller is coupled to the actuator such that the controller and the actuator are located within a single housing.

Another implementation of the present disclosure is a method of monitoring flow through a valve in a heating, ventilation, or air conditioning (HVAC) system. The method includes receiving pressure measurements from a first sensor for a valve body, the valve body comprising an inlet path, an outlet path, a valve member, and a valve stem coupled to the valve member, wherein the pressure measurements are based on a pressure in the inlet path and a pressure in the outlet path. The method further includes receive position measurements from a second sensor, the position measurements based on displacement of the valve stem. The method further includes determine a flowrate based at least on measurements from the first sensor and measurements from the second sensor. The method further includes determine an error indicating that the flowrate is outside of an acceptable threshold. The method further includes initiate corrective action within the HVAC system to correct the error.

In some embodiments, initiating corrective action includes adjusting control signals provided to HVAC equipment, the HVAC equipment configured to facilitate fluid flow through the valve body, wherein the HVAC equipment is a boiler or chiller or pump.

In some embodiments, the method further includes measuring a displacement of a diaphragm within the valve body.

In some embodiments, the method further includes receiving flow control device parameters from a database, the flow control device parameters including at least one of a specific gravity, a flow coefficient of the valve body, and diaphragm characteristics, determining a pressure differential between the pressure in the inlet path and the pressure in the outlet path based on at least the pressure measurements and the flow control device parameters, and determine the flowrate based on at least the pressure differential, the position measurements, and the flow control device parameters.

In some embodiments, the method further includes determining an amount of energy provided by a heat exchanger and adjusting the valve stem based on the amount of energy.

In some embodiments, the method further includes, receiving flow setpoint instructions, providing the measurements from the first, second, third, and fourth sensors as inputs to a machine learning module, using the machine learning module to generate a model of behavior of the fluid flowing through the valve body, and providing control signals to HVAC equipment based on the model to satisfy the flow setpoint instructions.

In some embodiments, determining the flowrate further includes querying a lookup table to compare at least one of the pressure measurements or the position measurements to determine an estimated flowrate, wherein the lookup table includes information specific to a type or a manufacture of the valve body.

In some embodiments, the method further includes adjusting operation of the valve stem based on control signals provided by a controller via an actuator coupled to the valve stem, the controller coupled to the actuator such that the controller and the actuator are located in a single housing.

Another implementation of the present disclosure is a flow control device for controlling flow in a heating, ventilation, or air conditioning (HVAC) system. The flow control device includes a valve body including an inlet path, an outlet path, a valve member, and a valve stem coupled to the valve member, a first sensor configured to obtain pressure measurements based on at least one of a pressure in the inlet path and a pressure in the outlet path, a second sensor configured to obtain displacement measurements of the valve stem, a third sensor located proximate to an inlet of a heat exchanger upstream of the flow control device, a fourth sensor located proximate to an outlet of the heat exchanger, and a controller including a processing circuit. The processing circuit is configured to determine a temperature differential of the heat exchanger based on measurements from the third sensor and the fourth sensor, determine a flowrate based at least on measurements from the first sensor and measurements from the second sensor, calculate energy throughput of the flow control device based on the temperature differential and the flowrate.

In some embodiments, the first sensor is further configured to measure a displacement of the diaphragm and provide the measurement of the displacement of the diaphragm to the controller.

In some embodiments, the controller is further configured to receive the measurements from the first sensor and the measurements from the second sensor, receive flow control device parameters from a database, the flow control device parameters comprising at least one of a specific gravity, a flow coefficient of the flow control device, and an diaphragm characteristics, determine a pressure differential between the pressure in the inlet path and the pressure in the outlet path based on at least the measurements from the first sensor and the flow control device parameters, and determine the flowrate based on at least the pressure differential and the flow control device parameters.

In some embodiments, the controller is further configured to receive flow setpoint instructions, provide the measurements from the first, second, third, and fourth sensors as inputs to a machine learning module, use the machine learning module to generate a model of behavior of the flow flowing through the flow control device, and provide control signals to HVAC equipment based on the model to satisfy the flow setpoint instructions.

In some embodiments, determining the flowrate further includes querying a lookup table to compare at least one of the measurements from the first sensor and the measurements from the second sensor to determine an estimated flowrate, wherein the lookup table includes information specific to a type or a manufacture of the flow control device.

DETAILED DESCRIPTION

Overview

Figure 1:
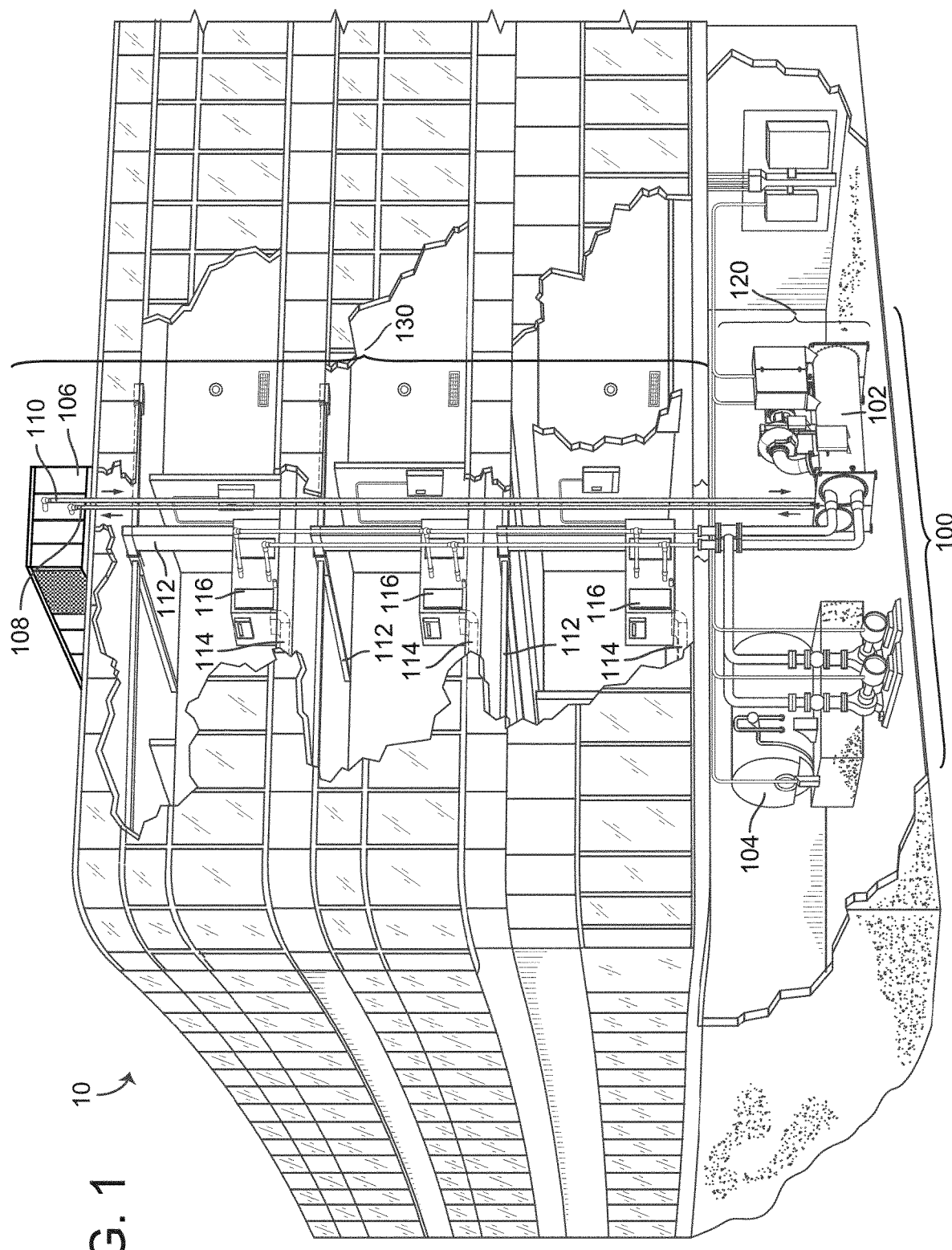
FIG. 1 is a schematic drawing of a building equipped with an HVAC system, according to some embodiments.

Referring generally to the FIGURES, systems and methods for controlling flow within a pressure independent valve are shown, according to some embodiments. In some embodiments, the systems include pressure independent control valves that maintain a substantially constant flowrate across a range of upstream-to-downstream pressure differentials. In a typical multi-zone hydronic system, each zone may employ a zone controller, a control valve-actuator(s) and one or more heat exchangers (e.g., fan coils, climate beams, etc.) through which the hydronic fluid is pumped. While the actual flowrate value through a particular zone may be unknown, the zone controller can monitor the ambient temperature of its zone and compare it to the desired temperature. If the actual temperature differs significantly (e.g., more than a predetermined threshold, etc.) from the desired temperature, the zone controller can send a command to the control valve-actuator assembly to adjust the flowrate through the heat exchanger(s) until the correct ambient temperature is restored. In one embodiment, the zone controller attempts to keep the zone temperature between a predetermined upper setpoint (e.g., nominal setpoint plus allowable error) and lower setpoint (e.g., nominal setpoint minus allowable error).

If the hydronic system does not include a device for regulating the pressure drop across the valve, the zone controller may also need to correct for fluctuations in the flowrate of the hydronic fluid. This may inherently result in zone temperature overshoots and undershoots. In some embodiments, the system includes a single circulating pump or pump array that supplies the hydronic pressure/flow to several zones and in some cases, the entire building. Because the pump/pump array may have a limited maximum flow capacity, a flowrate adjustment made in one zone may result in a change to upstream or downstream pressure and ultimately cause the flowrate in other zones to change. The unintended flowrate change in the other zones may result in out-of-range zone temperatures, to which those zone controllers will respond with additional control valve adjustments. Like the first adjustment, the subsequent adjustments made in the other zones may induce upstream or downstream pressure changes and thus create a "battle of the zones." These temperature correction periods may take several minutes, during which time a zone will be either too hot or too cold. This may cause the occupants in that zone to respond by changing the temperature setting on the thermostat (e.g., zone controller, etc.). This new temperature setting results in another control valve adjustment which may further disrupt the building's equilibrium.

From an operating efficiency perspective, the constant overshoot and undershoot described herein may cause increased energy consumption. The hunting or dithering phenomenon described above can lead to over-pumping, over-heating and/or over-cooling, which can all have a negative impact on the systems efficiency, thereby raising operating costs. In addition, the useful life of the system components (e.g., valves, actuators, pumps, etc.) are shortened due to the additional work cycles that they are performing.

To prevent pressure fluctuations from inducing flowrate changes, the pressure independent control (PIC) valve was developed. The simplest PIC valves may be fully mechanical in nature (e.g., aside from the actuator) and incorporate a self-contained differential pressure regulator which is disposed hydraulically in parallel with the control valve orifice. In some embodiments, mechanical PIC valve (mPIC) assemblies often require the installer to manually adjust the valve's setpoint to achieve the desired differential pressure ($\Delta P$). The mPIC valve attempts to maintain a constant pressure differential from its inlet to outlet ports so that upstream or downstream transient pressure events do not result in flowrate fluctuations. These devices can have some inherent shortcomings. For example, they may only be effective in suppressing flow fluctuations within a fixed pressure range. Below a minimum $\Delta P$ and above a maximum $\Delta P$, they may be unable to effectively maintain the originally intended flowrate. In another example, these devices can exhibit hysteresis when observing flowrate during a pressure rise versus a pressure decrease. Some mPIC valves are "field configurable", such that they can be reconfigured to offer a range of $C_v$ values. However, the reconfiguration may not be automated, as the valve may need to be mechanically adjusted in the field by a trained technician. This is a particular problem in buildings that rely on two-pipe systems and may need to perform summer-to-winter and winter-to-summer changeovers.

In winter months, hydronic hot water temperatures may commonly be kept between 60° C. and 93° C. depending on the heating load, as an example. As such, the water temperature may be a minimum of 21° C. above the typical inside ambient temperature during winter. For psychrometric reasons, the optimal chilled water temperature can typically be around 7° C. which can be approximately –1° C. below the typical summer indoor ambient air. Because heat transfer rate is a function of mass flowrate multiplied by temperature differential, significantly higher flowrates may be needed during the cooler months. This difference in seasonal flowrate may require that the mPIC valves be reconfigured at each seasonal changeover.

Regarding flowrate determination, many of these valves can include pressure taps for attaching a pressure gauge and measuring differential pressure. The pressure differential can then be used to estimate flowrate by referencing a lookup table which is supplied by the manufacturer. However, this can be a manually performed, time-consuming field measurement and therefore cannot be observed in real-time via the Building Automation System (BAS). To address many of the mPIC technologies' shortcomings, electronic PIC (ePIV) valves have been implemented in HVAC systems, which may include magnetic or ultrasonic flow meters in series with a ball valve, an electronic actuator and additional electronics which interface the flow meter and actuator. The additional electronics may contain control logic which monitors the command voltage from the zone controller and flowrate measurement from the flow meter.

When the zone controller sends a command to the ePIV, it may respond by adjusting the ball valve to achieve a flowrate value which is proportional to the command signal and independent of the actual valve position. When a pressure fluctuation causes a change to the flowrate, the flow meter can detect it and the actuator repositions to restore the desired flowrate. Additionally, the ePIV provides a real-time flowrate measurement output which can be connected to the BAS for performance monitoring. An advanced version of the ePIV, which is sometimes called an energy valve, may perform all of the aforementioned functionality but further include two temperature sensors which are installed upstream and downstream of the heat exchanger. By knowing the temperature drop across the heat exchanger and the flowrate, the energy valve may be able to provide a real-time measurement of energy throughput.

Some embodiments of the systems and methods disclosed herein include electronic pressure independent control systems for hydronic valves without the need for sensors directly measuring the flowrate. In some embodiments, electronic pressure independent control for hydronic valves is provided without the need for sensors directly measuring the flowrate. Advantageously, some embodiments of the systems and methods described herein increase energy efficiency, reduce operating costs and enhanced occupant comfort. In addition, the some embodiments of the systems and methods described herein provide similar building analytics (e.g., energy consumption, flowrate, temperature differential, etc.) as existing solutions.

As described herein, displacement can refer to translation, rotation, or any combination thereof. For example, displacement of a valve stem can refer to an actuator pushing/pulling a valve stem such that it translates, rotating the valve stem, or a combination thereof. As described herein, the valves described herein can be any type of valve, such as, for example, ball valves, butterfly valves, globe valves, choke valves, gate valves, and plug valves. The exemplary valves described herein are merely meant to be exemplary and should not be considered limiting.

Building Management System and HVAC System

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

In some embodiments, building 10 acts as a building or campus (e.g., several buildings) capable of housing some or all components of HVAC system 100. While the systems and methods described herein are primarily focused on operations within a typical building (e.g., building 10), they can easily be applied to various other enclosures or spaces (e.g., cars, airplanes, recreational vehicles, etc.).

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flowrate, temperature, or other attributes of the supply airflow through AHU 106 to achieve setpoint conditions for the building zone.

Figure 2:
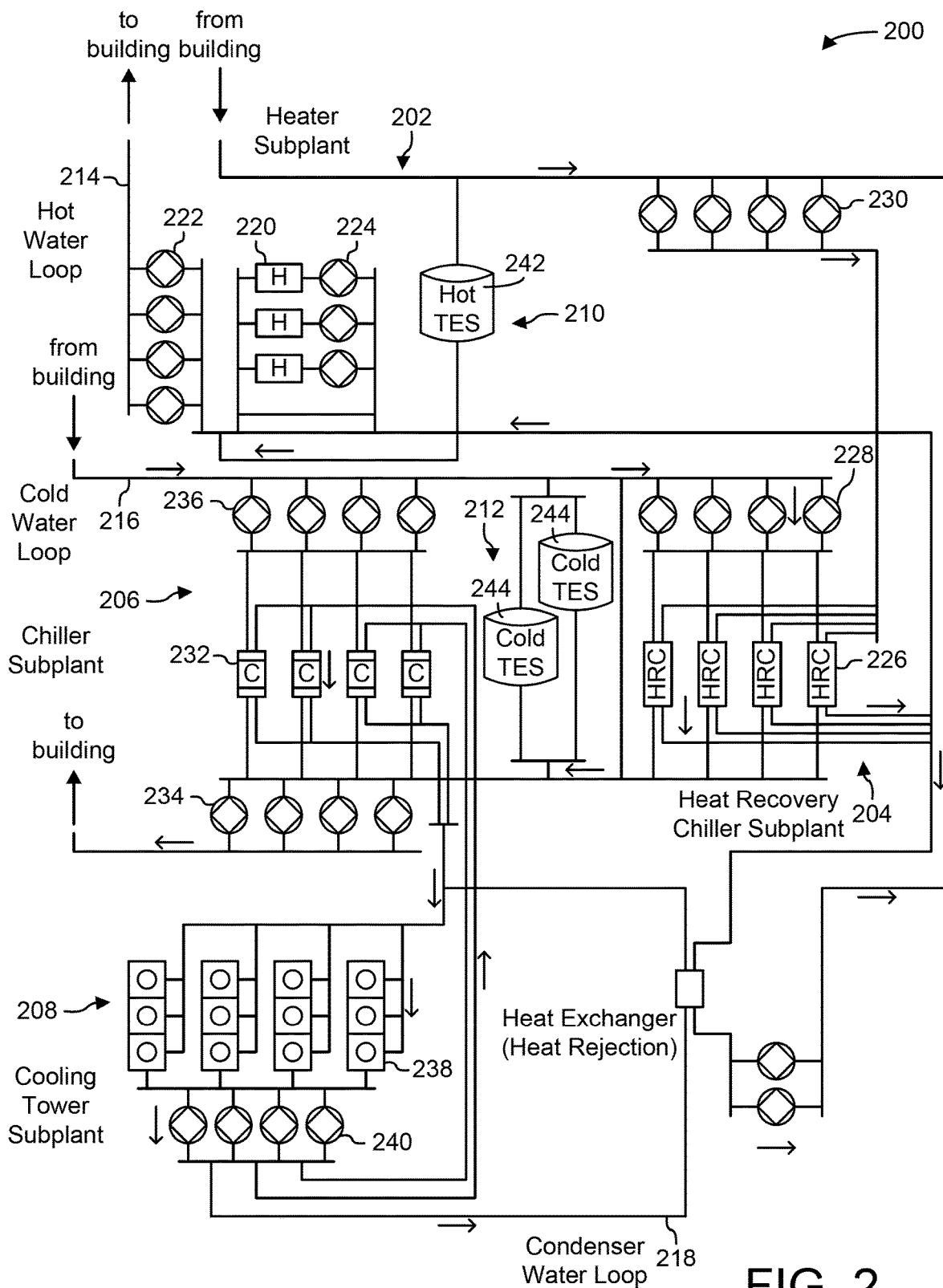
FIG. 2 is a schematic drawing of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
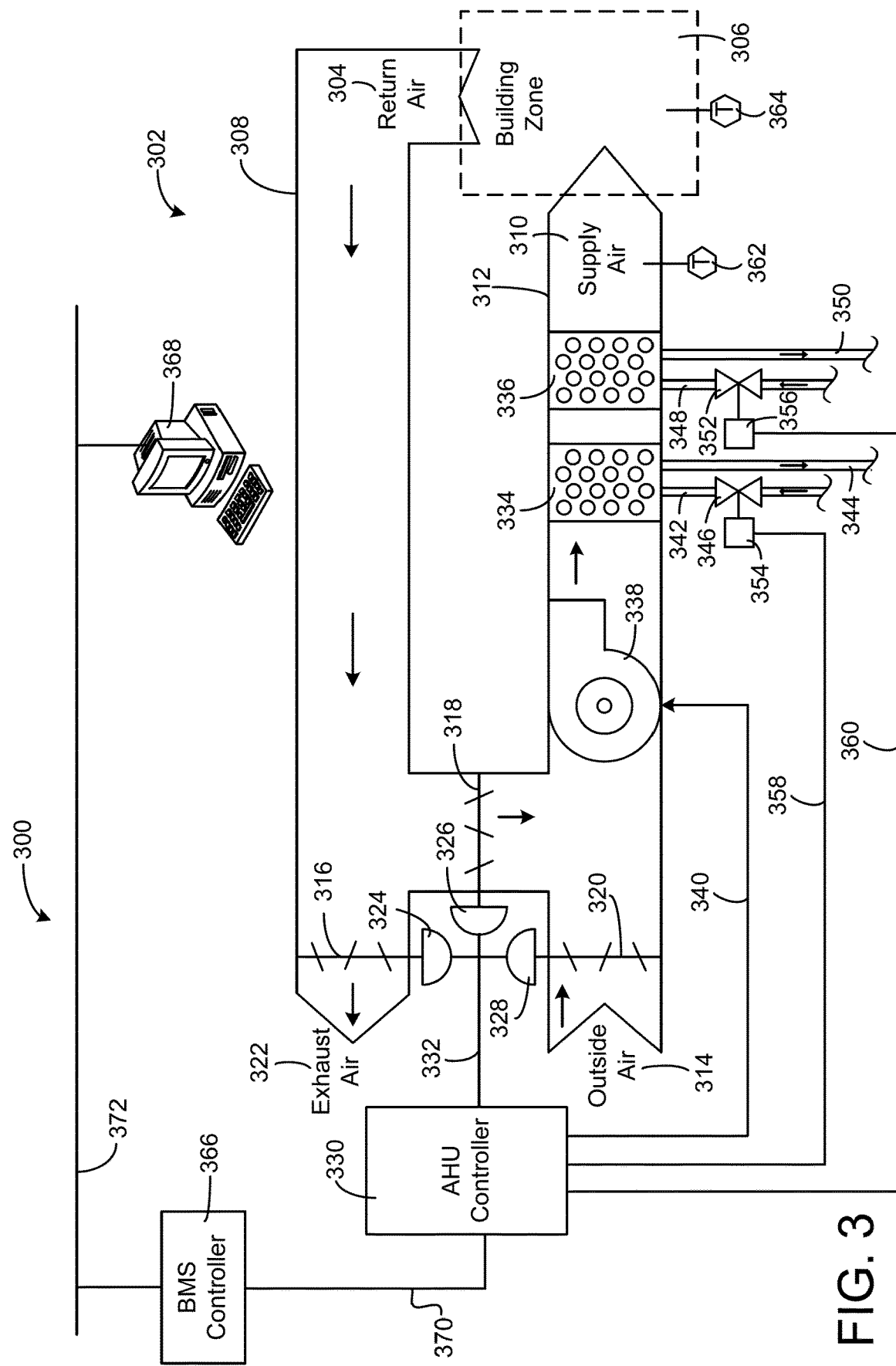
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100, or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flowrate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
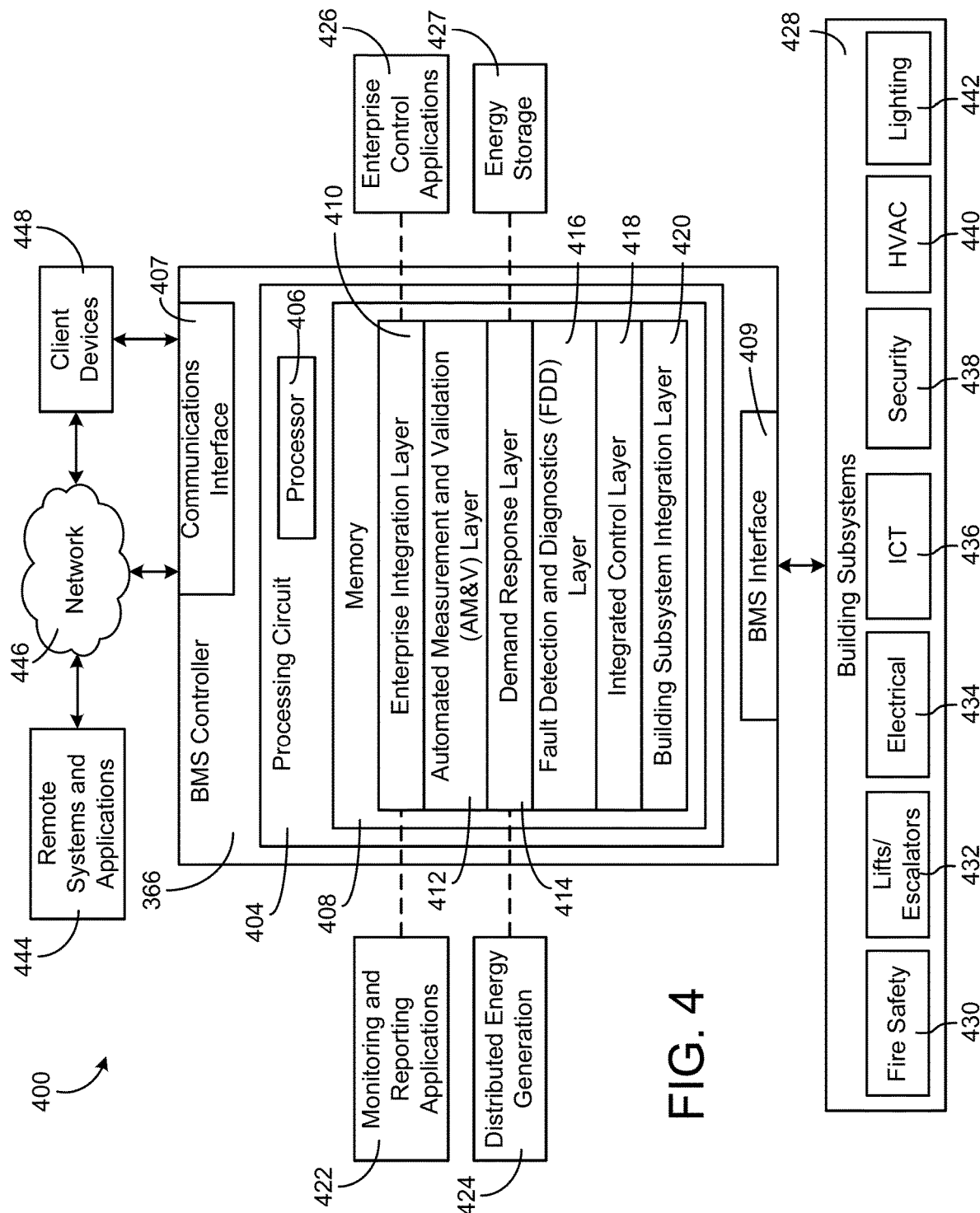
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application-specific integrated circuit (ASIC), one or more field-programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Valve Body Assembly

Figure 5A:
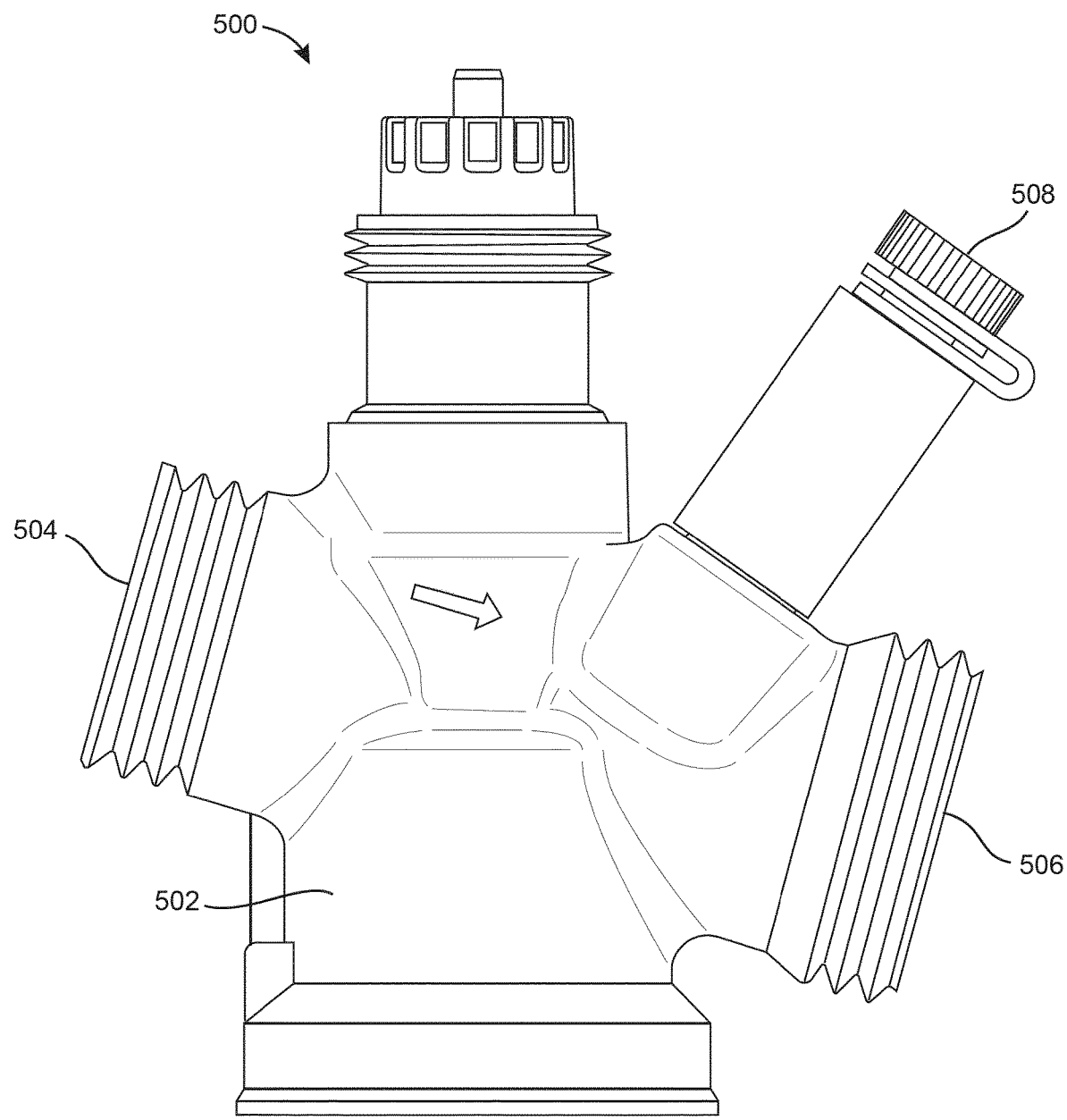
FIG. 5A is a side view, planar schematic drawing of a valve which can be used in the HVAC system of FIG. 1, according to some embodiments.

Referring now to FIG. 5A, valve 500 is shown, according to some embodiments. Valve 500 is shown to include main body 502, inlet 504, outlet 506, and measurement ports 508. Valve 500 may be configured to route fluid through water-side system 200 or airside system 300 as described above. For example, valves 346 and 352 may be or include some or all components of valve 500. Valve 500 may represent a type of pressure independent control (PIC) valve. As described in detail below, valve 500 may control flow by incorporating mechanical and/or electrical modification. Valve 500 is an electro-mechanical hybrid pressure independent control valve (hPIC) in some embodiments.

Figure 5B:
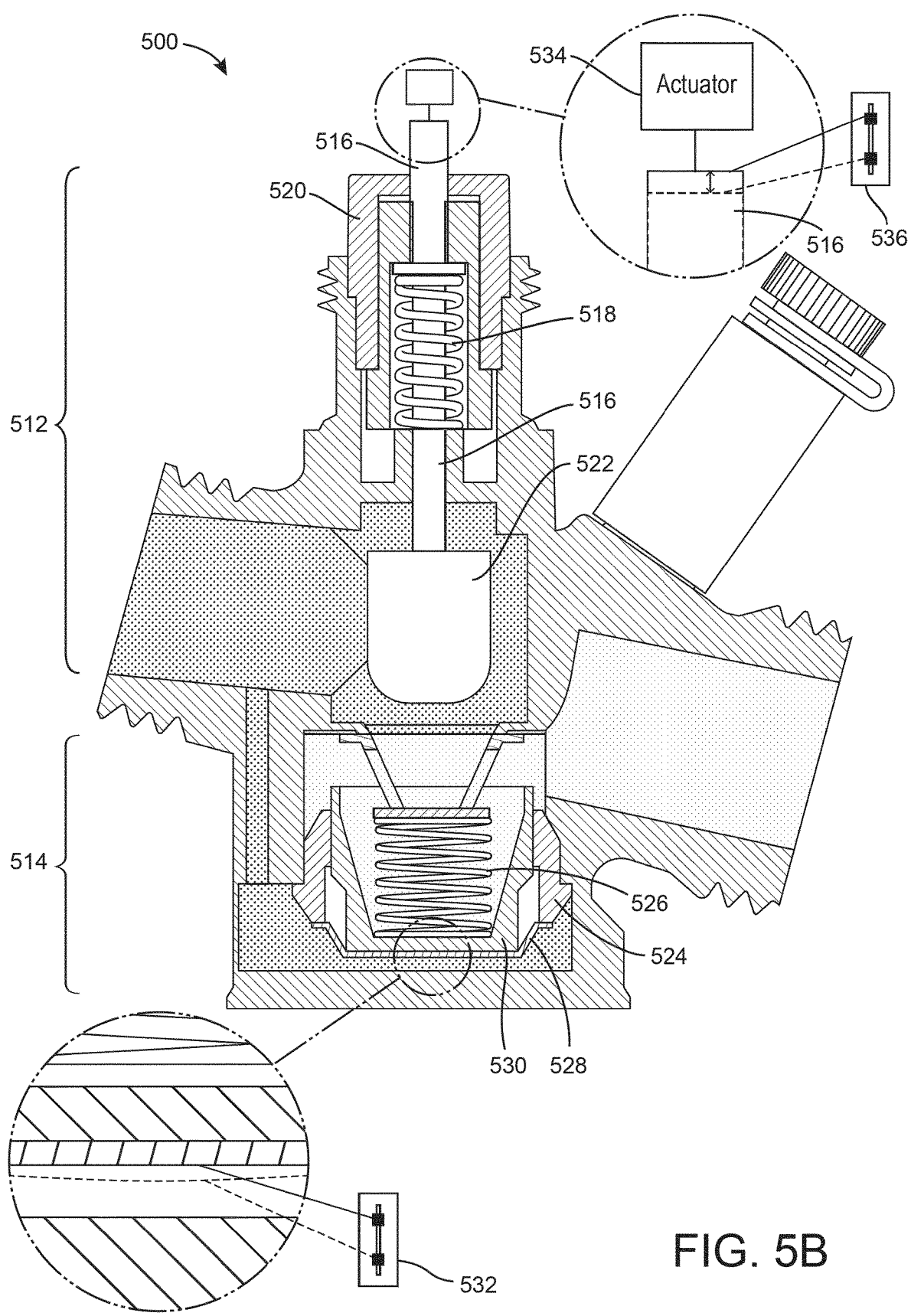
FIG. 5B is a cross-sectional view of the valve illustrated in FIG. 5A, according to some embodiments.

Referring now to FIG. 5B, valve 500 includes two separate sections, a control valve subsystem 512 and a pressure control subsystem 514. Control valve subsystem 512 may be configured to control the port size (e.g., valve orifice, etc.) by lowering or raising plug 522. For example, actuator 534 can receive a control signal (e.g., wirelessly, wiredly, from a mobile device, from a supervisory controller, etc.) to actuate valve stem 516 that pulls actuator valve stem 516 upward, which may engage spring 518. When plug 522 is fully engaged in the down position, plug 522 may be completely covering the port such that fluid cannot flow through. This may be considered a valve position at "0" displacement. As plug 522 is pulled upward, fluid may allowed to flow to outlet 506. In some embodiments, the fluid coming from inlet 504 is a higher pressure than the fluid leaving from outlet 506, creating a pressure differential between the high-pressure fluid and the low-pressure fluid. As shown in FIG. 5B, the high-pressure fluid is illustrated by the heavily-dotted space within the valve piping (left side), while the low-pressure fluid is illustrated by the lightly-dotted space within the valve piping (right side). The displacement of actuator valve stem 516 can be measured by one or more sensors. In some embodiments, linear displacement (or angular displacement, as described below), can indicate how much flow has been allowed to enter valve 500, as the opening to allow or restrict fluid flow can be increased or decreased in size. The measured linear displacement of actuator valve stem 516 can be measured by one or more measuring devices (e.g., linear potentiometer 536, etc.). For example, linear potentiometer 536 may provide a high voltage signal (e.g., 3.3V, 5V., etc.) when actuator valve stem 516 is raised completely so as to allow maximum flow, and a low voltage signal (e.g., 0V, etc.) when actuator valve stem 516 is lowered completely such that plug 522 covers the port completely to restrict flow. In some embodiments, plug 522 (and similarly actuator valve stem 516) can be positioned at any intermittent point between being completely closed and completely opened. While linear potentiometer 536 is used to record displacement measurements, this should not be considered limiting and any type of sensor may be appropriately used instead of a potentiometer.

Pressure control subsystem 514 may be configured to monitor and record pressure readings within valve 500. In some embodiments, pressure control subsystem 514 utilizes spring 526, to adjust the opening (e.g., orifice, etc.) for fluid to flow through. The high pressure fluid may enter underneath the spring via the off-shoot path from inlet path 502. The high pressure fluid then pushes the spring upward, displacing diaphragm 528. The spring assembly may be deposited within slides 524 for moving upwards and downwards. In some embodiments, spring 526 may move downwards in the event of lower-pressure entering the inlet path 502. As such, the opening for fluid to flow from inlet path 502 to outlet path 504 is governed via a displacement of spring 526 coupled to the opening, that raises and lowers based on the inlet fluid being at a high pressure or low pressure, respectively.

In some embodiments, diaphragm 528 is not responsible for regulating pressure within valve 500 and/or valve 550. As such, the varying pressure may be accounted for by other components, such as processing devices (e.g., controller 702, described below) that process measurements from sensors 532, 558, etc. In other embodiments, diaphragm 528 is responsible for regulating pressure and/or fluid flow within valve 500 and/or valve 550.

In some embodiments, linear potentiometer 536 is configured to monitor the displacement of actuator valve stem 516 to determine a representative value of how much the valve has been opened. In some embodiments, this value can be used as a reference to determine a flowrate value throughout valve 500. For example, a controller receives a voltage signal from linear potentiometer 536 of 4.5V. Based on a prior calibration between linear potentiometer 536 and valve 500, the controller knows that a 4.5V signal correlates to 85% open for valve 500. The controller can then determine that when valve 500 is open at 85%, the valve outputs 1.2 liters per second at a standard (e.g., known, typical, average, etc.) pressure. The relationship between the valve positioning and the flowrate may be determined by a lookup table, an external reference (e.g., the manual for the valve, etc.), an algorithm (as described below), or any combination thereof. In some embodiments, the controller determines the flowrate using the measurements from linear potentiometer 536 and other measured parameters, such as the diagram displacement of diaphragm 528, described in greater detail below.

In some embodiments, an algorithm receives the valve positioning measurements and the diaphragm displacement measurements to determine a more accurate measurement of the flowrate, compared to only determining the flowrate based on the valve positioning. When only the valve positioning is considered for determining flowrate, changes in pressure cannot be considered and can thus result in erroneous flow measurements. Conversely, combining the valve positioning measurements with the diaphragm displacement measurements (e.g., which displaces due to pressure changes) results in a more accurate reading of the flowrate throughout valve 500, as pressure can be taken into account.

In some embodiments, linear potentiometer 532 is shown measuring the diaphragm displacement of diaphragm 528. Diaphragm 528 may be used to adjust for the pressure changes within valve 500 to maintain a constant flow. For example, if the inlet fluid significantly increases in pressure, diaphragm 528 may be raised upward and engage with spring 526. Spring 526 may allow the assembly to slide upwards via slides 524 and reduce the port size for which fluid may flow through. As the inlet pressure decreases, diaphragm 528 may then lower and adjust accordingly. As diaphragm 528 raises and lowers proportionally to the pressure within valve 500, the measurements take from linear potentiometer 532 measuring the displacement of diaphragm 528 can be used to determine a pressure factor for determining flowrate. This is described in detail below.

Figure 6:
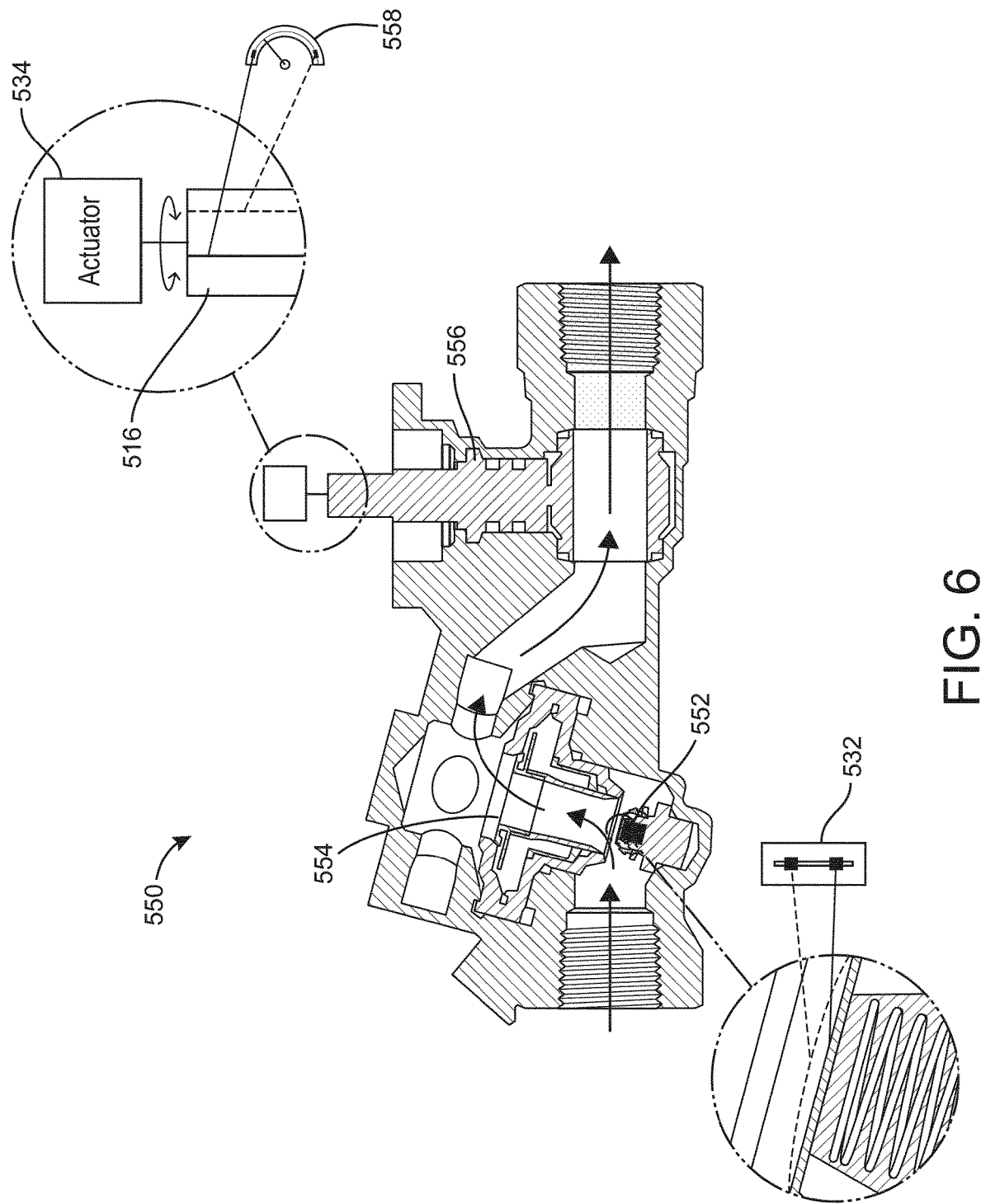
FIG. 6 is a cross-sectional view of a valve which can be used in the HVAC system of FIG. 1, according to some embodiments.

Referring now to FIG. 6, a valve 550 has a different valve configuration than valve 500, and is capable of measuring flowrate based on valve positioning measurements and diaphragm positioning measurements in some embodiments. Valve 550 may be similar to valve 500, but may use a rotational valve stem for increasing or decreasing the port for routing fluid through valve 550. Valve 550 is shown to include valve port assembly 556 including actuator valve stem 516. Actuator valve stem 516 may be rotated by actuator 534 to open or close the fluid port within the fluid line of valve 550. The rotational positioning of actuator valve stem 516 may be monitored by rotary potentiometer 558. In some embodiments, rotatory potentiometer 558 differs from linear potentiometers in that they can measure the angular displacement of a component (e.g., actuator valve stem 516), rather than the linear displacement.

Valve Assembly System

Figure 7:
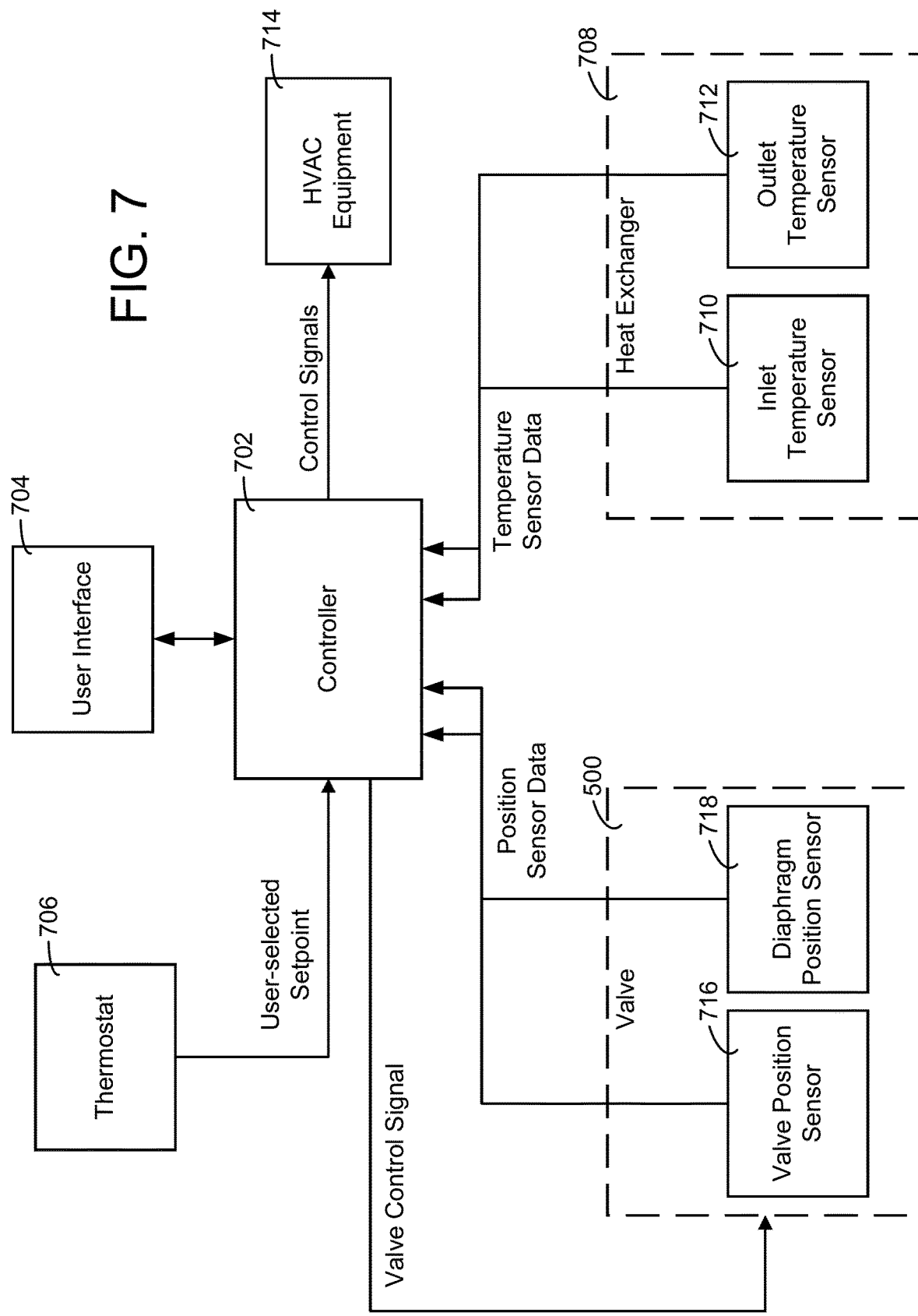
FIG. 7 is a block diagram of a system for determining flow throughout a valve assembly, which can be implemented in the BMS system of FIG. 4, according to some embodiments.

Referring now to FIG. 7, a block diagram 700 for determining flowrate is shown, according to some embodiments. Block diagram 700 can be implemented in any of the systems described above, such as waterside system 200, airside system 300, and BMS 400. Diagram 700 is shown to include controller 702, user interface 704, thermostat 706, valve 500, and heat exchanger 708.

Controller 702 may be configured to receive a user selected setpoint and provide control signals to HVAC equipment 714 to satisfy the setpoint request. The control signals may be based in part on the flowrates of the fluid flowing within the HVAC system and the energy transfer at one or more heat exchangers (e.g., heat exchanger 708, etc.).

For example, a user may request to increase the temperature in a building zone. Controller 702 may increase the flow of heated fluid through valve 500 that routes the heated fluid through heat exchanger 708. A fan then transfers the heat to supply air to the user's zone to satisfy the setpoint request. The flowrates of the fluid (e.g., the fluid flowing though cold water loop 216, etc.) may be determined based on numerous parameters, such as the position sensor data from valve position sensor 716 and/or diaphragm position sensor 532. Advantageously, controller 702 can determine a calculated flowrate based on these parameters, without the need of implementing a flow sensor.

In other embodiments, controller 702 is or includes an external controller (e.g., BMS controller 366). For example, sensors within valve 500 or 550 (FIG. 6) provide the sensor measurements to controller 702 over a wireless network. Controller 702 can then process the data and adjust the control system, without being directly coupled to valve 500. Controller 702 may be distributed across any number of processing devices. For example, a portion of the functionality of controller 702 may be performed on a processing device that is coupled to valve 500, such as the receiving of sensor measurements and analyzing the sensor data. Then, in response to determining that the sensor data is indicative of a control system adjustment, a signal is sent to a supervisory controller (e.g., BMS controller 366) to adjust the control signals sent to components within HVAC system 100.

In some embodiments, thermostat 706 provides a user-selected setpoint to controller 702. Controller 702 sends control signals to HVAC equipment 714 (e.g., chiller 102, boiler 104, actuator 534, etc.) to satisfy the selected setpoint. The control signals to the HVAC equipment may, in part, adjust the flow of fluid throughout HVAC system 100 (e.g., increase the flowrate, increase the fluid temperature, etc.). These adjustments may be measured by one or more sensors within HVAC system 100. For example, if valve 500 includes a valve within piping of HVAC system 100 that is directing heated fluid to AHU 106, valve 500 includes valve position sensor 716 and diaphragm position sensor 532 and/or other sensors (e.g., temperature sensors, etc.). These sensors can provide measurements back to controller 702 that can allow controller 702 to adjust the control signals to HVAC equipment 714 based on the received feedback from the sensors. In some embodiments, a key feedback parameter that is considered by controller 702 for adjusting control signals to HVAC equipment 714 is flowrate of the fluid flowing through valve 500. The flowrate of the fluid can be used to determine the pressure of the fluid, which can affect the control signals provided to HVAC equipment 714. For example, if the pressure significantly decreased in valve 500, and controller 702 determined this based on a measured flowrate, controller 702 may increase the flow opening (e.g., by actuating valve stem 516, etc.) through valve 500.

In some embodiments, valve position sensor 716 and diaphragm position sensor 718 are substantially similar or identical to linear potentiometer 532 and linear potentiometer 536 (or rotary potentiometer 558), respectively. As mentioned, potentiometers are used as exemplary embodiments of sensors for measuring parameters of valve 500 and should not be considered limiting. Other types of positon sensors can be utilized.

Figure 8:
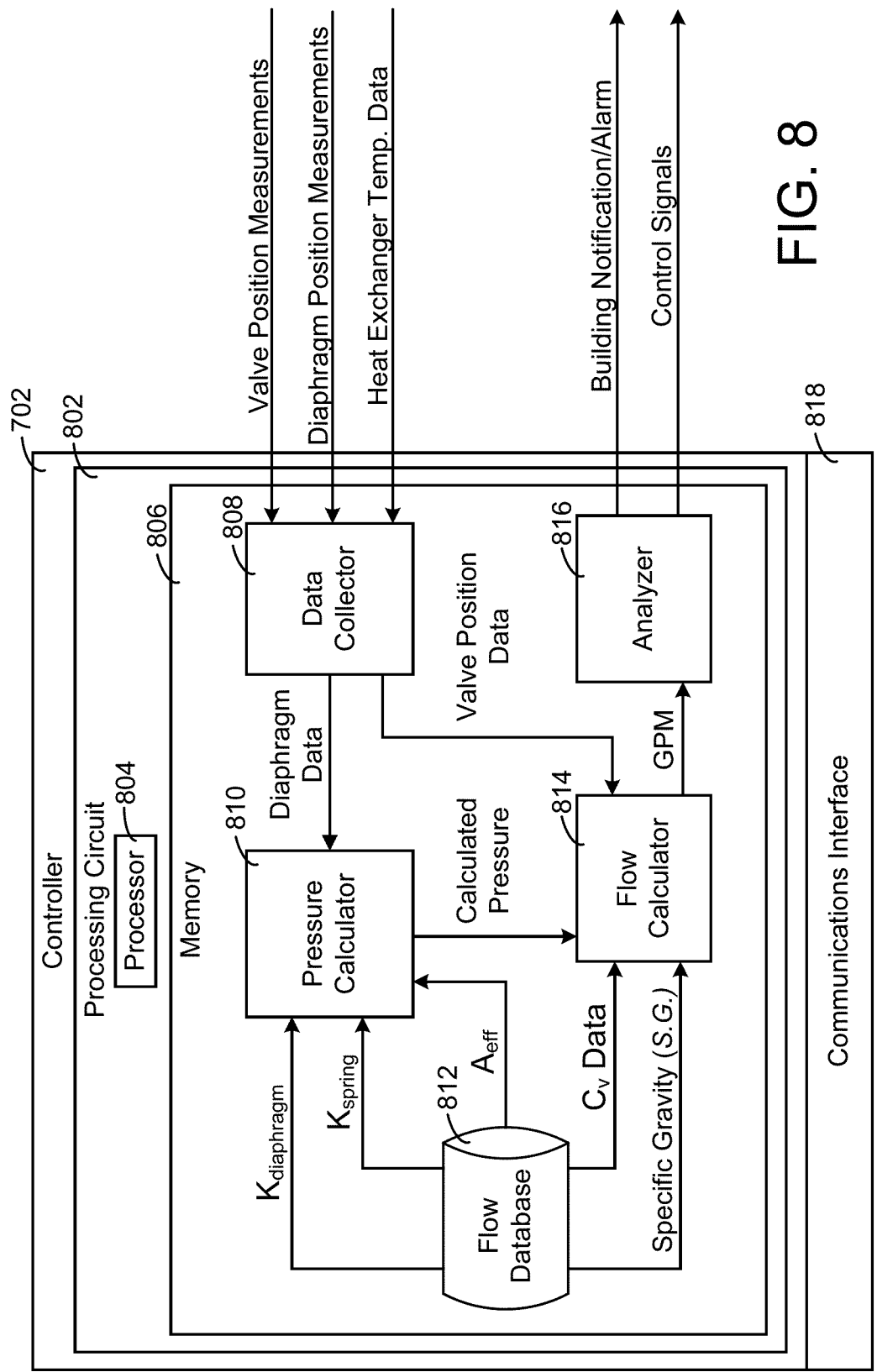
FIG. 8 is a block diagram of a controller for determining flow throughout a valve assembly, which can be implemented in the system of FIG. 7, according to some embodiments.

Referring now to FIG. 8, a detailed block diagram of controller 702 is shown, according to some embodiments. Controller 702 is shown to include processing circuit 802 including processor 804, memory 806, and communications interface 818. Processing circuit 802 can be communicably connected to communications interface 818 such that processing circuit 802 and the various components thereof can send and receive data via communications interface 818. Processor 804 can be implemented as a general purpose processor, an application-specific integrated circuit (ASIC), one or more field-programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to some embodiments, memory 806 is communicably connected to processor 804 via processing circuit 802 and includes computer code for executing (e.g., by processing circuit 802 and/or processor 804) one or more processes described herein.

In some embodiments, controller 702 is implemented within a single computer (e.g., one server, one housing, etc.). In various other embodiments, controller 702 can be distributed across multiple servers or computers (e.g., that can exist in distributed locations). Further, while FIG. 8 shows controller 702 as a separate controller from BMS controller 366, the functionality of controller 702 described herein can be performed partially or entirely within BMS controller 366 (or any other controller device described herein). Furthermore, one or more controllers (e.g., described herein or otherwise) may be responsible for performing the functionalities of controller 702. For example, data collector 808 may be implemented in a field controller of BMS 400, and analyzer 816 is performed within BMS controller 366 communicably coupled to the field controller. Controller 702 is also shown to include communications interface 818.

Communications interface 818 can be or include wired or wireless communications interfaces (e.g., jacks, antennas, transmitters, receivers, transceivers, wire terminals, etc.) for conducting data communications with devices within valve 500, or other external systems or devices (e.g., HVAC system 100, waterside system 200, airside system 300, BMS system 400, etc.). In various embodiments, communications via communications interface 818 can be direct (e.g., local wired or wireless communications) or via a communications network 446 (e.g., a WAN, the Internet, a cellular network, etc.). For example, communications interface 818 can include an Ethernet card and port for sending and receiving data via an Ethernet-based communications link or network. In another example, communications interface 818 can include a Wi-Fi transceiver for communicating via a wireless communications network. In another example, communications interface 818 can include cellular or mobile phone communications transceivers. Memory 806 is shown to include data collector 808, pressure calculator 810, flow database 812, flow calculator 814, and analyzer 816.

Data collector 808 may be configured to receive valve position measurements, diaphragm position measurements, and/or heat exchanger data (e.g., inlet temperature, outlet temperature, etc.). Data collector 808 may receive data wired or wirelessly. For example, a linear potentiometer located within valve 500 is wired directly to controller 702 to provide output signals including position information. Data collector 808 may be configured to provide diaphragm position data to pressure calculator 810 and valve position data to flow calculator 814. While only valve position measurements and diaphragm data is shown to be analyzed within controller 702, other data sets may be processed also. For example, controller 702 may receive heat exchanger data from heat exchanger 708 located upstream of valve 500. This data may be used to determine the amount of heat exchanged via heat exchanger 708, to monitor whether control adjustments need to be made.

Pressure calculator 810 may be configured to receive sensor data and calculate a pressure based on the received sensor data. For example, pressure calculator 810 uses the following equation:

$$\Delta P = \frac{K_{TOT} * \Delta X}{A_{EFF}}$$

Where $\Delta P$ is the calculated pressure differential, $K_{TOT}$ is the total proportional constant of the system, $\Delta X$ is the measured linear displacement of the diaphragm (e.g., away from home position, etc.), and $A_{EFF}$ is the effective hydraulic area of the diaphragm. $K_{TOT}$ may include the spring constant of the spring that moves diaphragm 528 within valve 500 (i.e., $K_{SPRING}$), the proportional constant of the diaphragm (i.e., $K_D$), or any combination thereof. The data relating to the material parameters of the components within valve 500 (e.g., $K_{SPRING}$, $K_D$, etc.) may queried from one or more databases, such as flow database 812. The above equation is merely meant to be exemplary and should not be considered limiting, and other calculations may be used to calculate a pressure differential within valve 500. Pressure calculator 810 may be configured to provide the calculated pressure to flow calculator 814.

In some embodiments, several types of spring characteristics and/or diaphragm characteristics may be considered as inputs into flow calculator 814. For example, the force the diaphragm provides, the spring constant, the spring rate, and/or the effective area of the diaphragm may be input into flow calculator 814.

Flow calculator 814 may be configured to receive the calculated pressure and other parameters and determine a calculated flow flowing though valve 500. For example, flow calculator 814 may use the following equation:

$$f_{valve} = C_v \sqrt{\frac{\Delta P}{S.G.}}$$

Where $f_{valve}$ is the flow through valve 500, $C_v$ is the flow coefficient for valve 500, $\Delta P$ is the calculated pressure differential, and S. G. is the specific gravity (e.g., 1 for water, etc.) of the fluid flowing through valve 500 (e.g., heated water, air, etc.). In some embodiments, $C_v$ and S. G. are received by flow database 812. Flow database 812 may store one or more of the constant values required for calculations within controller 702. In other embodiments, flow database 812 is located externally from controller 702 and is queried by controller 702 for the data. Flow calculator 814 is shown to provide the flow value calculation to analyzer 816.

Analyzer 816 may be configured to determine whether the determined flow calculation is indicative of one or more issues or errors within BMS 400. For example, BMS 400 may provide control signals to pump fluid through valve 500 to reach a user selected setpoint. In some embodiments, controller 702 knows an acceptable flowrate that is required to flow through valve 500 to reach the user selected setpoint. Analyzer 816 may compare the calculated flowrate with a predetermined acceptable flowrate that is based on the control schema (e.g., the flowrate that is required to reach a setpoint that controller 702 has been instructed to reach, etc.).

Analyzer 816 may be configured to provide one or more alarms/notifications to a user in response to the flow calculation analysis. For example, controller 702 may provide a push notification to a BMS device (e.g., a technician's laptop, a mobile device, a BMS workstation, etc.) indicating that the flowrate is abnormally low/high within the piping in which valve 500 is located. In some embodiments, analyzer 816 can automatically adjust for the errors detected. For example, analyzer 816 may provide a control signal to a pump to increase the flow flowing through valve 500 in response to determining that the calculated flowrate through valve 500 is abnormally low.

Flowrate Calculation Processes

Figure 9:
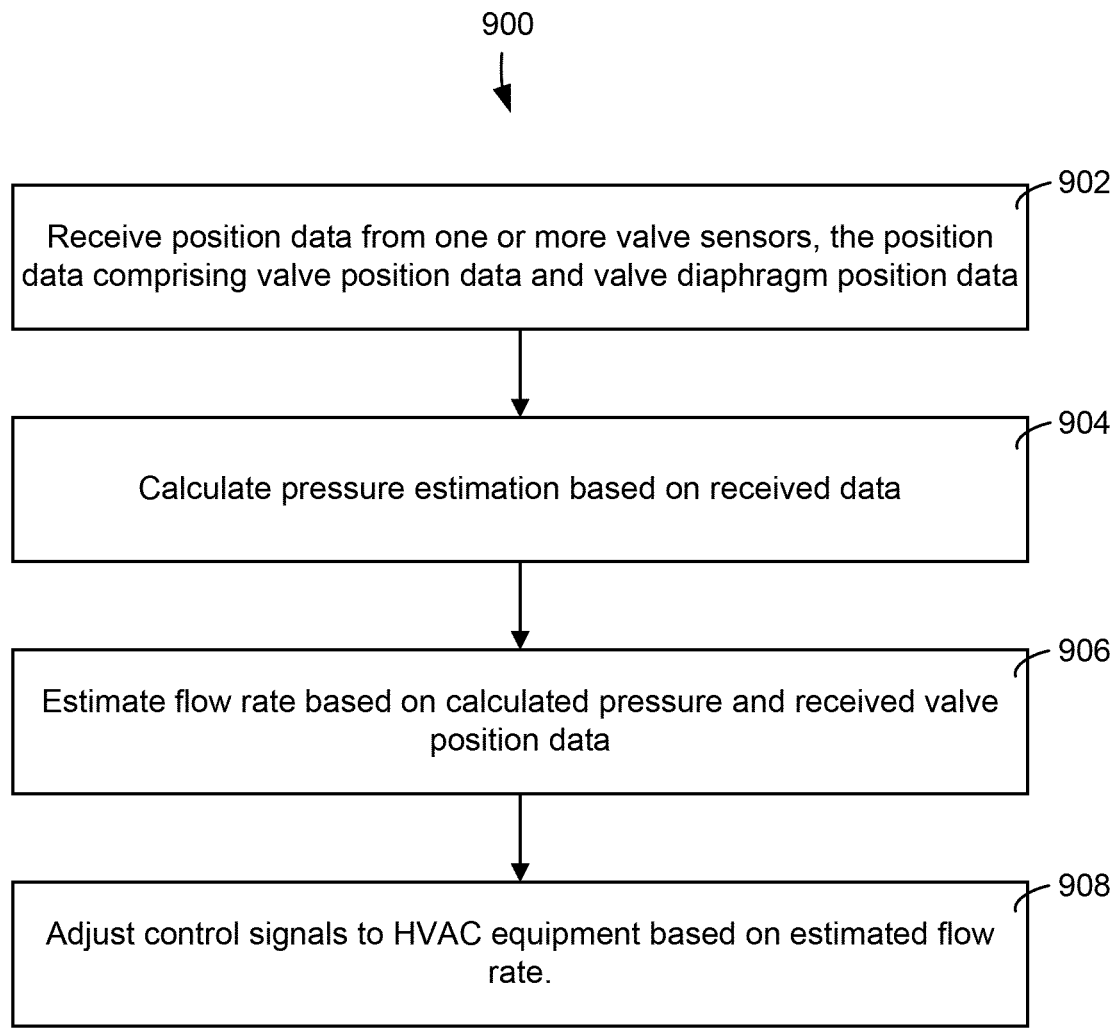
FIG. 9 is a flow diagram of a process for monitoring flowrate through a valve assembly, which can be performed by the controller of FIG. 7, according to some embodiments.

Referring now to FIG. 9, a process 900 for calculating flowrate without directly measuring the flowrate (e.g., via an ultrasonic flow meter, etc.) within a valve, according to some embodiments. Process 900 can be performed by any processing device described herein. For example, process 900 is performed by processing circuit 802 within controller 702 as shown in FIG. 8.

Process 900 is shown to include receiving position data from one or more valve sensors, the position data comprising valve position data and valve diaphragm position data (step 902). The position data may be or include rotational data based on the angle of rotation of the valve stem and/or valve body, linear displacement of the valve stem/valve body, or any combination thereof. The position data may be or include any type of information that indicates a change or adjustment in the office size within valve 500.

In some embodiments, linear potentiometer 532 may measure the displacement of diaphragm 528, as described above. These measurements may then be provided to controller 702 for analytics. Measurements via any one of the sensors described herein may take measurements in real time, continuously, discreetly, at set time intervals, or any combination thereof.

Process 900 is shown to include calculating pressure estimation based on received data (step 904). In some embodiments, pressure calculator 810 calculates the pressure differential between the path at inlet 504 and outlet 506, as described above. Process 900 is shown to include estimating flowrate based on calculated pressure and received valve position data (step 906). In some embodiments, this step includes querying a lookup table to compare at least one of the measurements from the first sensor and the measurements from the second sensor to determine an estimated flowrate, wherein the lookup table comprises information specific to the type or manufacture of the flow control device. For example, pressure calculator 810 calculates a pressure. Then, controller 702 queries a lookup table (e.g., stored in flow database 812, etc.) to determine the estimated flowrate for the type/manufacture of valve 500 at that pressure. This may be performed manually or automatically.

Process 900 is shown to include adjusting control signals to HVAC equipment based on estimated flowrate (step 908). Controller 702 or another controller described herein (e.g. BMS controller 366, etc.) may be configured to adjust control signals provided to HVAC equipment 714. For example, in response to determining that the flowrate through valve 500 is 5 gallons per minute (gpm) lower than an acceptable threshold between 12-15 gpm, controller 702 sends a signal to pump 222 to increase the flowrate (e.g., by increasing the pressure, etc.). In some embodiments, the flowrate may be greater than the acceptable threshold and controller 702 lowers the pump speed to decrease the flowrate through valve 500. In other embodiments, a threshold range is not used, and a minimum or maximum flow is used to determine errors in flowrate. These examples are merely meant to be exemplary and should not be considered limiting.

Figure 10:
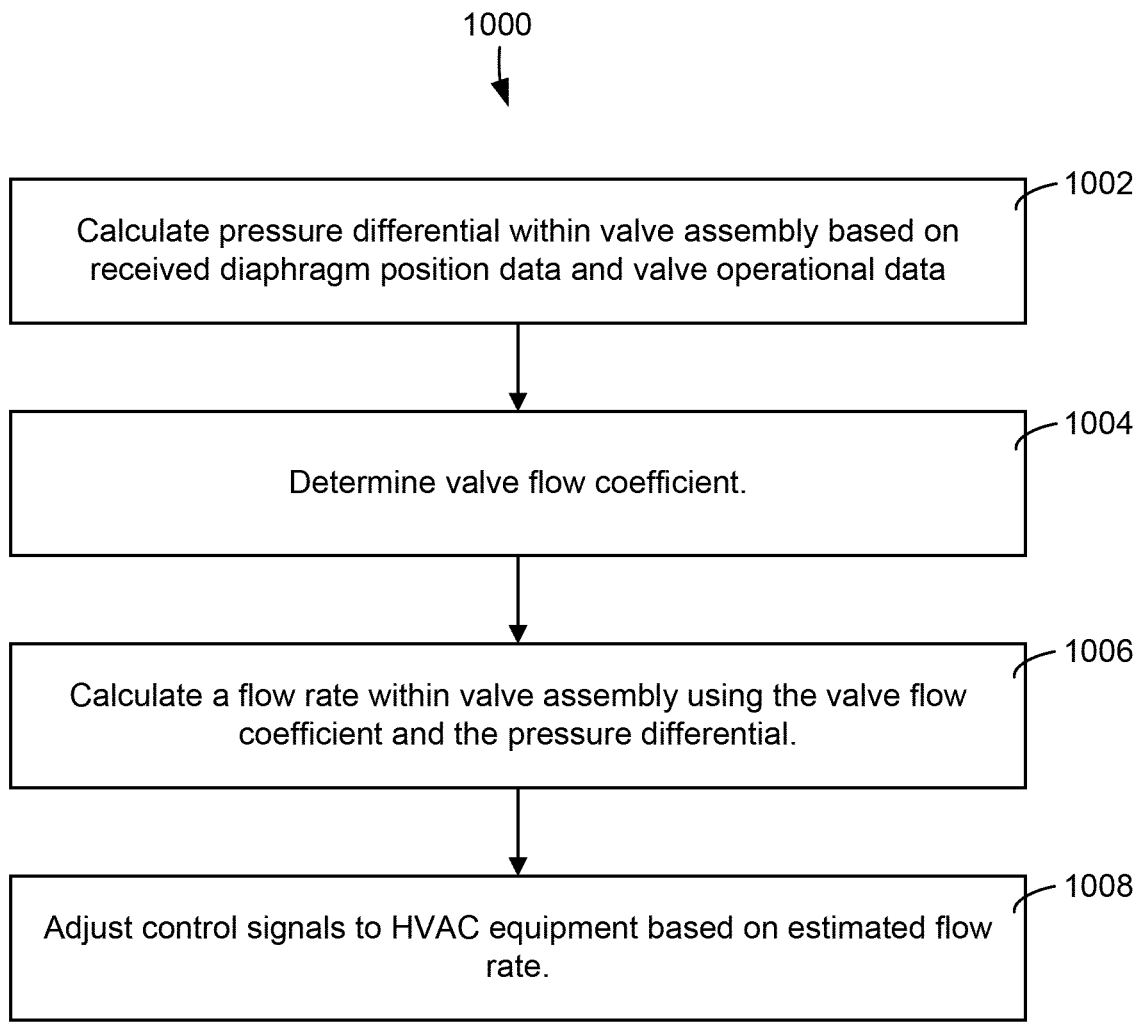
FIG. 10 is a flow diagram of a process for calculating a flowrate based on measured parameters, which can be performed by the controller of FIG. 7, according to some embodiments.

Referring now to FIG. 10, a process 1000 for determining a flowrate is shown, according to some embodiments. Process 900 can be performed by any processing device described herein. For example, process 900 is performed by processing circuit 802 within controller 702 as shown in FIG. 8. Process 1000 may be implemented within process 900. For example, process 900 is implemented within steps 904-906 in process 900.

Process 1000 is shown to include calculating a pressure differential within valve 500 based on received diaphragm position data and valve operational data (step 1002). Process 1000 is shown to include determining a valve flow coefficient (step 1004). Process 1000 is shown to include calculating a flowrate (e.g., within valve 500, valve 550, etc.) using the valve flow coefficient and the pressure differential (step 1006). Process 1000 is shown to include adjusting control signals to HVAC equipment 714 based on estimated flowrate (step 1008).

In some embodiments, controller 702 receives instructions to achieve a setpoint (e.g., via a user device, etc.). Controller 702 receives measurements from linear potentiometer 536, linear potentiometer 532, and sensors 710, 712 and provides them as inputs to a neural network model (e.g., machine learning module, etc.). The neural network may then generate a model of behavior of the flow flowing through the flow control device and provide control signals to HVAC equipment 714 based on the generated model to satisfy the flow setpoint instructions. In some embodiments, the neural network is trained prior to receiving the sensor data or is trained using the sensor data.

Figure 11:
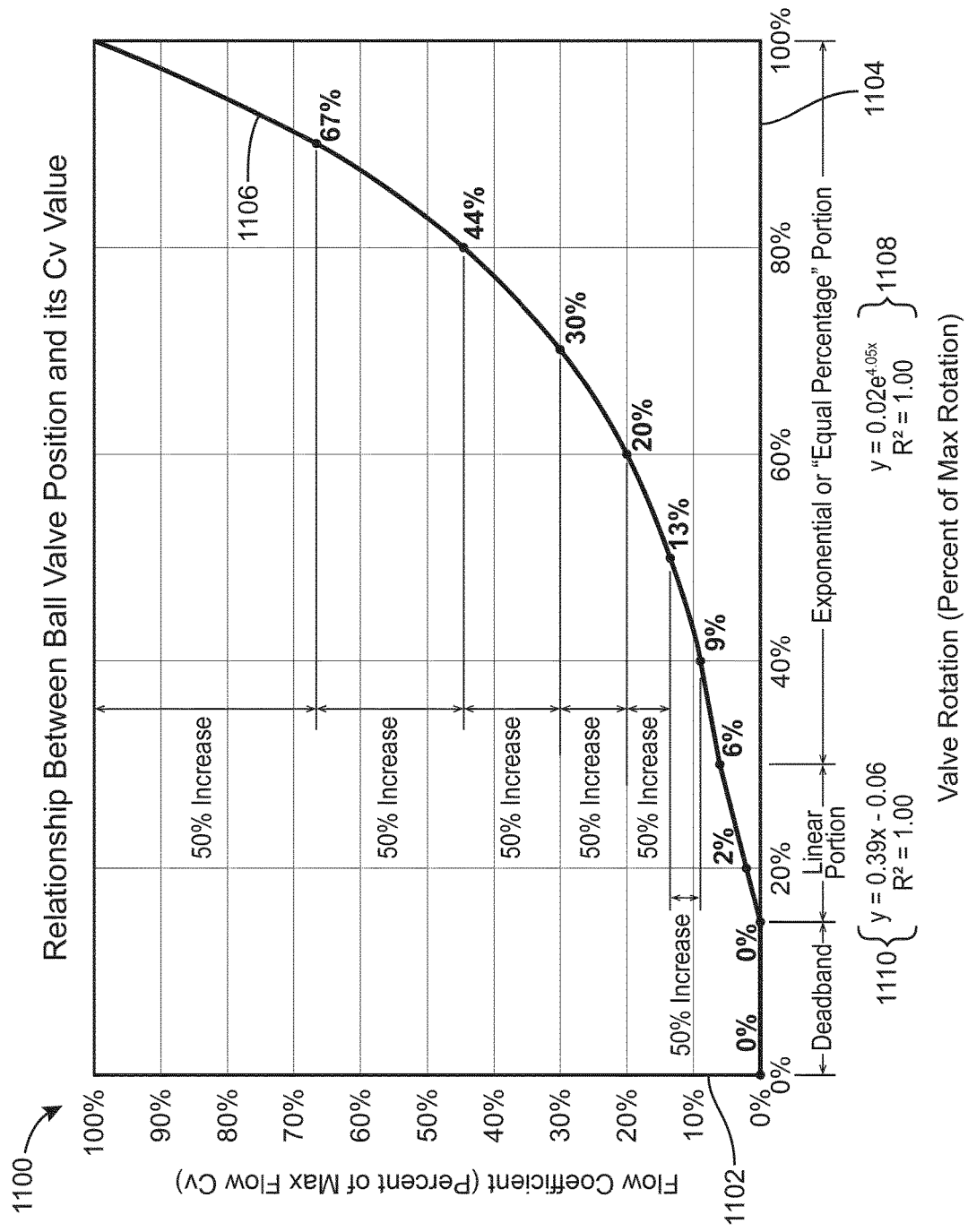
FIG. 11 is a graph displaying the relationship between flow coefficient of a valve assembly and valve rotation, according to some embodiments.

Referring now to FIG. 11, a graph 1100 shows the relationship between the y-axis 1102: percent of the maximum flow coefficient (%) and x-axis 1104: the valve rotation (i.e., percent of valve rotation) (%) within a valve, according to some embodiments. In some embodiments, graph 1100 is representative of the properties of valve 500 and/or valve 550. Graph 1100 shows how three separate sections of behavior during rotation of a valve, the dead band range, the linear portion range, and the exponential ("equal percentage") range. As detailed in equations 1108, 1110, as the valve rotation increases past approximately 40%, the flow coefficient increases exponentially as the valve rotation increases. This shows that merely measuring the valve rotation is insufficient to accurately determine a representative flowrate across all ranges of valve rotation.

In some embodiments, ball valves (e.g., valve 500, etc.) exhibit an exponential or "equal percentage" relationship between valve opening and flowrate (at a given pressure differential). Valve 500 and/or valve 550 may have a dead band (i.e., no flow) range (e.g., of approximately 15%, etc.). Additionally, may also include a short pseudo-linear section which connects the dead band section to the exponential section (e.g., line 1106 after 13%, etc.). As long as the valve's rated (i.e. fully open) $C_v$ value and valve position is known, then the $C_v$ of the valve at said position can be determined. Determination of the $C_v$ value in the systems disclosed herein could be equation-based or could utilized pre-programmed lookup tables.

Figure 12:
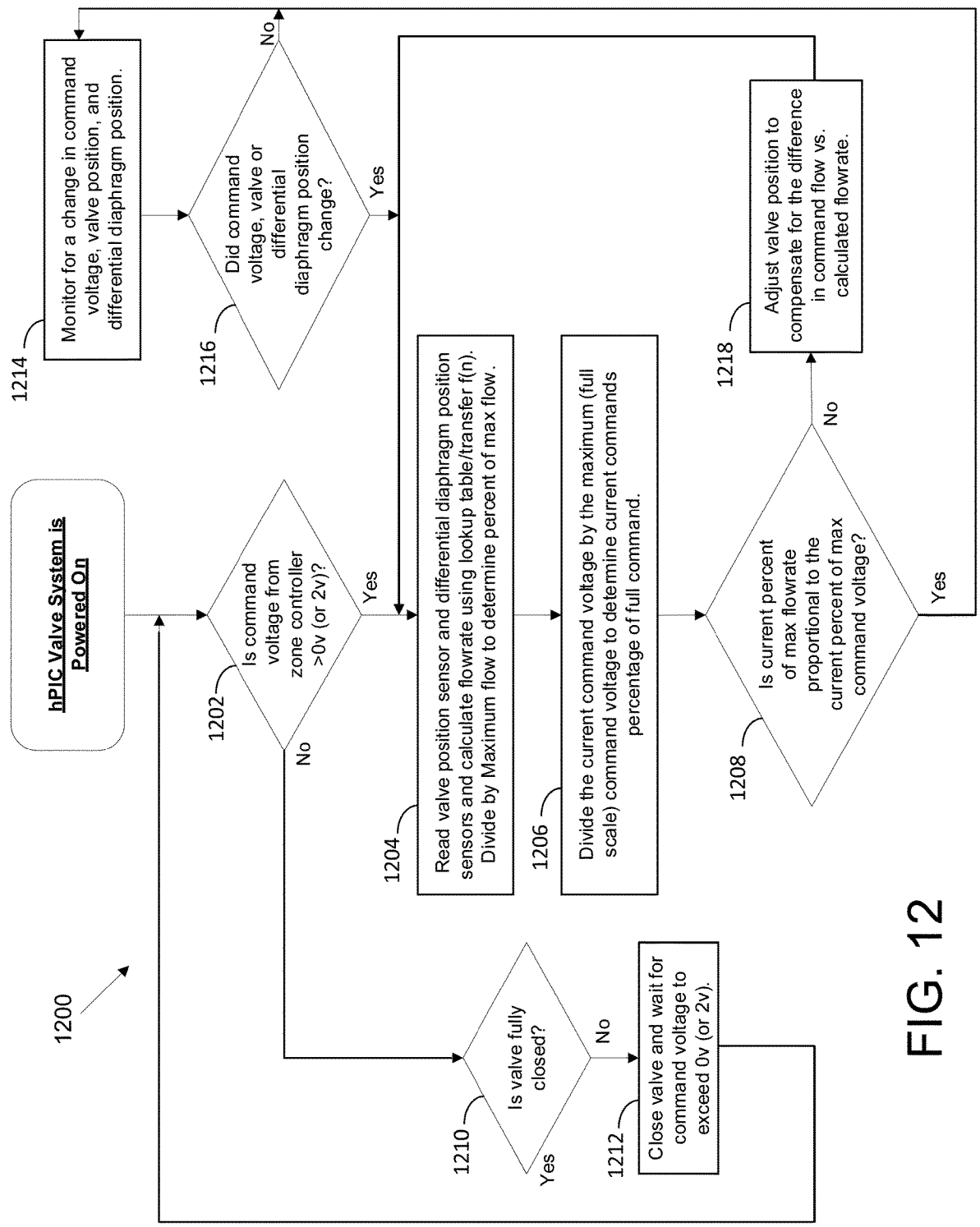
FIG. 12 is a flow diagram of a process for calculating a flowrate based on measured parameters, which can be performed by the controller of FIG. 7, according to some embodiments.

Referring now to FIG. 12, a process 1200 is shown for calculating flowrate based on measured parameters, according to some embodiments. Process 1200 may be performed by any of the processing devices disclosed herein. For example, process 1200 is performed by controller 702.

Process 1200 is shown to include determining if the command voltage from the zone controller is greater than zero volts (V) (e.g., 2V, etc.) (step 1202). In some embodiments, this step includes waiting to receive an indication that the flowrate determination processes should be initiated. For example, pressure calculator 810 may receive a command signal of 2V indicating that the process for calculating pressure, and determining the flowrate can begin. If the command voltage is not greater than zero, process 1200 may determine whether the valve is fully closed (step 1210). If not, the valve may be closed and the system will wait for the command voltage to exceed zero.

Process 1200 is shown to include reading a valve position sensor and differential diaphragm position sensor(s) and calculating a flowrate using a lookup table or transfer function, then diving the calculated maximum flow to determine a percent of maximum flow. In some embodiments, data collector 808 may receive the diaphragm position sensors and valve position sensor data and provide the data to pressure calculator 810. Pressure calculator 810 and flow calculator 814 may be used to determine the flow rate. Then analyzer 816 may divide the calculated flowrate from the maximum flowrate to determine the percent of maximum flow.

Process 1200 is shown to include dividing the current command voltage by the maximum (e.g., full scale, etc.) command voltage to determine the current command percentage of full command (step 1206). Then, process 1200 may determine if the current percent of maximum flow rate is proportional to the current percent of maximum command voltage (step 1208). If so, process 1200 may monitor for a change in command voltage, valve position, and/or differential diaphragm position (step 1214). Once a change in command voltage, valve position, and/or differential diaphragm position is determined (step 1216), process 1200 may return to step 1204 and the process repeats.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A flow control device for controlling flow in a heating, ventilation, or air conditioning (HVAC) system, the flow control device comprising:
   a pressure-regulating valve comprising an inlet path and an outlet path;
   a moveable fluid barrier configured to adjust a size of an opening of the pressure-regulating valve;
   a control valve comprising a valve member and a valve stem coupled to the valve member;
   a first sensor configured to obtain pressure measurements within the pressure-regulating valve based on linear displacement of the moveable fluid barrier;

a second sensor configured to obtain linear and angular displacement measurements of the valve stem; and a controller comprising a processing circuit configured to:
determine a flowrate based at least on the pressure measurements from the first sensor and the linear and angular displacement measurements from the second sensor;
determine an amount of energy provided by a heat exchanger; and
adjust the valve stem based on the amount of energy and a factor related to the flowrate.

2. The flow control device of claim 1, wherein the controller is further configured to:
receive the pressure measurements and the displacement measurements;
receive flow control device parameters from a database, the flow control device parameters comprising at least one of a specific gravity, a flow coefficient of the flow control device, a diaphragm characteristic, and a spring characteristic;
determine a pressure differential between the pressure in the inlet path and the pressure in the outlet path based on at least the displacement measurements of the pressure-regulating valve and the flow control device parameters; and
determine the flowrate based on at least the pressure differential and the flow control device parameters.

3. The flow control device of claim 1, wherein the controller is further configured to:
receive flow setpoint instructions for the flow control device;
provide the pressure measurements and the displacement measurements as inputs to a machine learning module;
use the machine learning module to generate a model of behavior of the flow; and
provide control signals to HVAC equipment based on the model to satisfy the flow setpoint instructions.

4. The flow control device of claim 1, wherein determining the flowrate further comprises querying a lookup table to compare at least one of the pressure measurements and the displacement measurements to determine an estimated flowrate, wherein the lookup table comprises information specific to a type or a manufacture of the flow control device.

5. The flow control device of claim 1, further comprising:
an actuator configured to drive the valve stem, wherein the actuator is coupled to the valve stem; and
wherein the controller is coupled to the actuator such that the controller and the actuator are located within a single housing.

6. A method of monitoring flow of a fluid through a valve in a heating, ventilation, or air conditioning (HVAC) system, the method comprising:
placing a flow control device within a fluid flow path, the flow control device comprising:
a pressure-regulating valve comprising an inlet path and an outlet path,
a moveable fluid barrier configured to adjust a size of an opening of the pressure-regulating valve,
a control valve comprising a valve member and a valve stem coupled to the valve member;
receiving pressure measurements from a first sensor for the pressure-regulating valve, based on linear displacement of the moveable fluid barrier;
receiving position measurements from a second sensor, the position measurements based on linear and angular displacement of the valve stem;
determining a flowrate based at least on measurements from the first sensor and measurements from the second sensor;
determining an amount of energy provided by a heat exchanger;
determining an error indicating that the flowrate is outside of an acceptable threshold; and
initiating corrective action within the HVAC system to correct the error, wherein initiating corrective action comprises at least adjusting the valve stem based on the amount of energy and a factor related to the flowrate.

7. The method of claim 6, wherein initiating corrective action comprises adjusting control signals provided to HVAC equipment, the HVAC equipment configured to facilitate fluid flow through the moveable fluid barrier, wherein the HVAC equipment is a boiler or chiller or pump.

8. The method of claim 6, wherein the method further comprises receiving the pressure measurements from the first sensor, the pressure measurements based on one or more linear and angular displacement measurements of the moveable fluid barrier.

9. The method of claim 6, wherein the method further comprises:
receiving flow control device parameters from a database, the flow control device parameters comprising at least one of a specific gravity, a flow coefficient of the pressure-regulating valve, a diaphragm characteristic, and a spring characteristic;
determining a pressure differential between the pressure in the inlet path and the pressure in the outlet path based on at least the displacement measurements of the pressure-regulating valve and the flow control device parameters; and
determine the flowrate based on at least the pressure differential, the position measurements, and the flow control device parameters.

10. The method of claim 6, wherein the method further comprises:
receiving flow setpoint instructions;
providing the measurements from the first sensor and the second sensor as inputs to a machine learning module;
using the machine learning module to generate a model of behavior of the fluid flowing through the pressure-regulating valve; and
providing control signals to HVAC equipment based on the model to satisfy the flow setpoint instructions.

11. The method of claim 6, wherein determining the flowrate further comprises querying a lookup table to compare at least one of the pressure measurements or the position measurements to determine an estimated flowrate, wherein the lookup table comprises information specific to a type or a manufacture of the pressure-regulating valve.

12. The method of claim 6, wherein the method further comprises adjusting operation of the valve stem based on control signals provided by a controller via an actuator coupled to the valve stem, the controller coupled to the actuator such that the controller and the actuator are located in a single housing.

13. A flow control device for controlling flow in a heating, ventilation, or air conditioning (HVAC) system, the flow control device comprising:
a pressure-regulating valve comprising an inlet path and an outlet path;
a moveable fluid barrier configured to adjust a size of an opening of the pressure-regulating valve;
a control valve comprising a valve member and a valve stem coupled to the valve member;

a first sensor configured to obtain pressure measurements within the pressure-regulating valve based on linear displacement of the moveable fluid barrier;

a second sensor configured to obtain linear and angular displacement measurements of the valve stem;

a third sensor located proximate to an inlet of a heat exchanger upstream of the flow control device;

a fourth sensor located proximate to an outlet of the heat exchanger; and a controller comprising a processing circuit configured to:
  determine a temperature differential of the heat exchanger based on measurements from the third sensor and the fourth sensor;
  determine a flowrate based at least on measurements from the first sensor and measurements from the second sensor;
  calculate energy throughput of the flow control device based on the temperature differential and the flowrate; and
  adjust the valve stem based on the energy throughput and a factor related to the flowrate.

14. The flow control device of claim 13, wherein the controller is further configured to:
  receive the measurements from the first sensor and the measurements from the second sensor;
  receive flow control device parameters from a database, the flow control device parameters comprising at least one of a specific gravity, a flow coefficient of the flow control device, and a diaphragm characteristic;
  determine a pressure differential between the pressure in the inlet path and the pressure in the outlet path based on at least the displacement measurements of the pressure-regulating valve from the first sensor and the flow control device parameters; and
  determine the flowrate based on at least the pressure differential and the flow control device parameters.

15. The flow control device of claim 13, wherein the controller is further configured to:
  receive flow setpoint instructions;
  provide the measurements from the first, second, third, and fourth sensors as inputs to a machine learning module;
  use the machine learning module to generate a model of behavior of the flow flowing through the flow control device; and
  provide control signals to HVAC equipment based on the model to satisfy the flow setpoint instructions.

16. The flow control device of claim 13, wherein determining the flowrate further comprises querying a lookup table to compare at least one of the measurements from the first sensor and the measurements from the second sensor to determine an estimated flowrate, wherein the lookup table comprises information specific to a type or a manufacture of the flow control device.

17. The flow control device of claim 1, wherein the pressure-regulating valve further comprises a first spring coupled to an orifice of an opening of the pressure-regulating valve and the moveable fluid barrier;
  wherein the moveable fluid barrier is configured to be displaced via the first spring, to adjust a size of the opening.

18. The flow control device of claim 1, wherein the control valve further comprises a second spring coupled to the valve stem.

19. The method of claim 6, wherein the flow control device further comprises:
  a first spring coupled to an orifice of an opening of the pressure-regulating valve and the moveable fluid barrier; and
  a second spring coupled to the valve stem;
  wherein the moveable fluid barrier is configured to be displaced via the first spring, to adjust the size of the opening.

20. The flow control device of claim 13, wherein the flow control device further comprises:
  a first spring coupled to an orifice of an opening of the pressure-regulating valve and the moveable fluid barrier; and
  a second spring coupled to the valve stem;
  wherein the moveable fluid barrier is configured to be displaced via the first spring, to adjust the size of the opening.

* * * * *